(12) United States Patent
Childs

(10) Patent No.: US 7,926,702 B2
(45) Date of Patent: Apr. 19, 2011

(54) ADJUSTABLE-SIZE REUSABLE GIFT WRAP AND METHOD

(76) Inventor: Jocelyn Childs, Denver, CO (US)

(*) Notice: Subject to any disclaimer, the term of this patent is extended or adjusted under 35 U.S.C. 154(b) by 698 days.

(21) Appl. No.: 12/002,267

(22) Filed: Dec. 14, 2007

(65) Prior Publication Data
US 2009/0152332 A1 Jun. 18, 2009

(51) Int. Cl.
B65D 65/38 (2006.01)
B65D 75/34 (2006.01)
B65D 30/00 (2006.01)
B65D 30/22 (2006.01)
B65D 33/28 (2006.01)
B65D 33/00 (2006.01)

(52) U.S. Cl. ......... 229/87.19; 229/87.5; 383/2; 383/40; 383/75; 383/105

(58) Field of Classification Search ............... 229/87.18, 229/87.19, 87.5, 89; 383/2, 4, 40, 75, 105
See application file for complete search history.

(56) References Cited

U.S. PATENT DOCUMENTS

| | | | |
|---|---|---|---|
| 1,269,276 A | | 6/1918 | Harris |
| 1,269,594 A | * | 6/1918 | Geraghty ..................... 2/209.11 |
| 1,552,824 A | | 9/1925 | Chick |
| 1,748,087 A | | 2/1930 | Spanel |
| 1,941,871 A | * | 1/1934 | Struve ............................ 383/72 |
| 2,035,384 A | | 3/1936 | Hinchliff |
| 2,497,325 A | | 2/1950 | Scherba |
| 2,502,586 A | | 4/1950 | Ottinger |
| 2,565,283 A | * | 8/1951 | Throckmorton ................ 383/75 |
| 2,635,664 A | * | 4/1953 | Cohen ........................... 150/103 |
| 3,285,307 A | * | 11/1966 | Dormaier ......................... 383/4 |
| 3,349,936 A | * | 10/1967 | Morton et al. .............. 217/3 BC |
| D270,036 S | | 8/1983 | De Jesus |
| 4,646,804 A | * | 3/1987 | Damiano ...................... 150/112 |
| D296,870 S | | 7/1988 | Myers |
| 4,763,369 A | | 8/1988 | Spector |
| 4,799,520 A | | 1/1989 | Blackburn et al. |
| 4,858,361 A | | 8/1989 | White |
| D309,257 S | | 7/1990 | Myers |
| 4,957,246 A | | 9/1990 | Kantor |
| 5,004,144 A | | 4/1991 | Selga |

(Continued)

FOREIGN PATENT DOCUMENTS

FR 2720380 A1 5/1994

(Continued)

OTHER PUBLICATIONS

Photo of gift wrap bag, 2005.

(Continued)

*Primary Examiner* — Jes F Pascua
(74) *Attorney, Agent, or Firm* — John R. Ley; Leon S. Erikson

(57) ABSTRACT

A gift wrapping enclosure encloses a gift which has been inserted within an interior of a main body formed of flexible material. An end portion of the main body surrounding an open end is folded back to form a cuff. An interior surface is exposed at the cuff, and the exposed cuff surface has a different color, texture or material characteristic from the main body. The main body is constricted at the cuff to close the open end and confine the gift, and is expanded at the cuff to provide access to the interior to remove the gift.

22 Claims, 9 Drawing Sheets

U.S. PATENT DOCUMENTS

| | | | |
|---|---|---|---|
| 5,161,895 A | 11/1992 | Myers | |
| 5,183,199 A | 2/1993 | Bills | |
| 5,303,427 A * | 4/1994 | Fishbaine | 2/209.11 |
| 5,392,983 A | 2/1995 | Clarke-Bolling et al. | |
| 5,407,125 A | 4/1995 | Yates et al. | |
| D359,452 S | 6/1995 | Hauck | |
| 5,456,062 A | 10/1995 | Wechsler | |
| 5,529,395 A | 6/1996 | French | |
| D375,896 S | 11/1996 | Martinson et al. | |
| 5,634,317 A | 6/1997 | Bylenga | |
| 5,709,068 A | 1/1998 | Bylenga | |
| 5,743,458 A | 4/1998 | French | |
| 5,788,067 A | 8/1998 | Marcellis | |
| 5,817,379 A * | 10/1998 | Rich et al. | 428/35.2 |
| 5,850,963 A | 12/1998 | Chang | |
| 5,904,289 A | 5/1999 | Hagan | |
| D411,671 S * | 6/1999 | Hamblin | D32/36 |
| 5,934,548 A | 8/1999 | Kenyon | |
| 5,979,744 A | 11/1999 | Brigleb | |
| 6,085,695 A | 7/2000 | Miller et al. | |
| 6,092,932 A | 7/2000 | Pekala et al. | |
| D431,002 S | 9/2000 | Bertozzi et al. | |
| 6,126,054 A | 10/2000 | Riemer | |
| 6,241,389 B1 | 6/2001 | Gilmore et al. | |
| 6,267,244 B1 | 7/2001 | Witt et al. | |
| 6,550,813 B1 | 4/2003 | Siegrist | |
| 6,647,697 B1 | 11/2003 | Zarrow et al. | |
| 6,774,296 B2 | 8/2004 | Aesch | |
| D619,021 S * | 7/2010 | Yamada | D9/713 |
| 2002/0162881 A1 | 11/2002 | Umanoff | |
| 2004/0026488 A1 | 2/2004 | Beach | |
| 2005/0201642 A1 | 9/2005 | Terry | |
| 2009/0175564 A1* | 7/2009 | Broering et al. | 383/75 |
| 2009/0196535 A1* | 8/2009 | Dorsey et al. | 383/74 |
| 2009/0232422 A1* | 9/2009 | Broering et al. | 383/75 |
| 2010/0086242 A1* | 4/2010 | Morizane | 383/75 |

FOREIGN PATENT DOCUMENTS

| | | |
|---|---|---|
| FR | 2862289 A1 | 11/2003 |
| GB | 2374064 A | 9/2002 |
| JP | 2001114295 A | 4/2001 |

OTHER PUBLICATIONS

U.S. Appl. No. 29/293,864, filed Dec. 14, 2007.

* cited by examiner

ADJUSTABLE-SIZE REUSABLE GIFT WRAP AND METHOD

This invention relates to a flexible and reusable gift wrapping enclosure or container, and more particularly to a new and improved reusable gift wrapping enclosure that is adjustable in length and size to contain different sizes of gifts in an aesthetically appealing manner.

BACKGROUND OF THE INVENTION

A traditional aspect of gift-giving or gift-exchanging in many cultures involves concealing the gift within a decorative wrapping, which is usually decorative paper. Wrapping a gift in decorative paper adds to the recipient's pleasure and anticipation by creating an aura of beauty and mystery about the gift. Choosing decorative wrapping paper that matches the occasion further contributes to the generosity and pleasure of giving and receiving the gift.

Although wrapping the gift in decorative paper is a desirable enhancement to giving, receiving and exchanging gifts, the decorative wrapping paper is usually used only once and is then discarded as trash. This wasteful practice creates a variety of different environmental issues. The decorative wrapping paper is usually manufactured from wood pulp obtained from trees. More extensive use of decorative wrapping paper requires that more trees be cut and processed for paper production. Used wrapping paper which has become trash often ends up in landfills and contributes to the problem of waste disposal in general.

Another environmental issue related to traditional gift wrapping using decorative wrapping paper involves the common practice of wrapping the gift in a cardboard or other semi-rigid paper-product gift box. The gift box establishes a geometric shape which is more easily covered with the decorative wrapping paper. Many gifts have irregular shapes or are flexible in nature, which makes them difficult to cover with the wrapping paper in an aesthetic manner. Attempts to wrap odd-shaped or flexible gifts without first putting them into a box usually results in unsightly wrinkles, gaps in coverage, and possibly even tears in the decorative wrapping paper. On the other hand, placing the gift in a rectangular or other regular geometrically-shaped box allows the box to be covered with the decorative wrapping paper in a pleasantly appearing manner. Using a box when wrapping a gift becomes another requirement for giving and exchanging decoratively wrapped gifts in their most aesthetically pleasing form.

The boxes used to contain gifts also contribute to environmental issues. Boxes are typically made from paper, and the paper is derived from wood pulp. Wrapping a box which holds the gift also uses more decorative wrapping paper than would be used from wrapping the gift itself, because the box has a greater surface area which must be covered by the decorative wrapping paper. After the wrapping paper is removed and the gift is taken from the box, both the wrapping paper and the box are frequently discarded as trash. Using the box and the wrapping paper contributes to excessive consumption and waste disposal problems.

Wrapping a gift with decorative wrapping paper usually requires, in addition to the gift box, adhesive tape and a ribbon. The adhesive tape is required to hold the decorative paper in place over the gift box, and the ribbon is traditionally included to enhance the aesthetic appeal of the wrapped gift box. The adhesive tape and the ribbon also frequently become trash which must be discarded. The act of wrapping the box or gift with decorative wrapping paper also requires physical dexterity that young persons and those persons with physical disabilities or ineptitude may lack. Wrapping the gift is also time consumptive. In some circumstances, the decorative wrapping paper may not be sufficiently durable to resist tearing or pulling away. Under such circumstances, the aesthetic appearance of the decoration may be diminished and viewing the gift through a separation in the wrapping paper may provide a clue to the recipient concerning the nature of the gift. There are many other disadvantages associated with using decorative wrapping paper and boxes to give and exchange gifts.

One solution to some of the disadvantages of using decorative wrapping paper is to use a gift sack. A gift sack is a bag or container, typically made of flexible material such as cloth or paper, which is used to contain and conceal the gift. Use of the gift sack does not require wrapping the gift in decorative paper, since the gift is placed directly into the gift sack itself which is typically decorative. One disadvantage associated with using a paper gift sack is that it frequently becomes trash after the gift has been given. Another disadvantage of a gift sack is that it is typically sized and shaped to accept gifts of a certain size, or a limited range of sizes. If the gift sack is unduly large compared to the size of the gift, the gift sack appears out of proportion from an aesthetic standpoint and can even be mistaken as empty. Sometimes the gift sacks have a non-closable opening which requires additional decorative papers to be placed into the gift sack to conceal the gift within it. Other types of gift sacks which have a closable opening are still sized and shaped to accept gifts of a limited range of sizes.

Many gift sacks, particularly those made from fabric, lack a convenient location to affix a gift card which identifies the intended recipient and the person giving the gift. Cards are often affixed to decorative wrapping paper with adhesive tape. Gift sacks which are made from fabric usually do not permit the tape to adhere sufficiently to the fabric to prevent the card from becoming disconnected from the gift sack. Cards can also be attached by using a ribbon or string, but there must be a place for the card to be attached to the gift sack, and there must be some method of attaching the card to the gift sack. Although the ribbon or string can be attached to the card by extending it through a hole punched in the card or in an envelope for the card, the gift sack generally does not have a convenient way to attach the ribbon or string. Consequently, the ribbon or string may be permanently sewed or attached to the gift sack, which can create a relatively unaesthetic appearance if the ribbon or string is not used.

SUMMARY OF THE INVENTION

The present invention relates to a gift wrapping enclosure which is made of materials which allow it to be repeatedly reused to avoid the undesirable effects of consuming important environmental resources, which is adjustable in size to accommodate different sized gifts while creating an aesthetic appearance regardless of the size of the gift, which does not does not create an empty appearance if the size of the gift is relatively small, which conveniently holds and retains a gift card, which does not aesthetically detract from its appearance if a gift card is not used, which does not require a box to contain the gift to establish an aesthetic appearance, which completely surrounds and encloses the gift without gaps or openings that detract from the aesthetic appearance and provide an opportunity for an early discovery of the nature of the gift, which provides different aesthetic appearances depending upon its condition of use, which can be cleaned to prolong its useful longevity, which is easier and less time consuming to use, and which improves a reusable gift wrapping enclosure in general while overcoming many of the disadvantages in the prior art.

In accordance with these and other features, one aspect of the present invention involves a gift wrapping enclosure in which to give and exchange a gift. The gift wrapping enclosure includes a main body formed of flexible material and having an interior and at least one open end providing access into the interior. The interior receives the gift. The main body also includes an interior surface adjacent to the interior and an exterior surface opposite from the interior. A channel is formed in the main body adjacent to and circumscribing the open end. A constriction element is located within the channel for constricting the main body at the channel to close the open end. The constriction element also expands the open end to provide access to the interior and to the gift within the interior. A cuff surrounds the open end and is formed by folding an end portion of the main body back over the exterior surface. The cuff exposes a portion of the interior surface at the location where the end portion of the main body segment is folded back over the exterior surface. The folded back end portion of the main body which forms the cuff includes the channel and the constriction element.

Other and additional subsidiary aspects of the gift wrapping enclosure may include some or all of the following. The length of the end portion of the main body which is folded back to form the cuff is selectable in length, to constrict the main body adjacent to gifts having different lengths. The constriction element may comprise a drawstring having free ends which extend from opposite ends of the channel and which can be connected together to maintain the constriction of the main body and to close the open end. The interior surface has one of a color, texture or material which is different from the respective color, texture or material of the exterior surface adjacent to the cuff. A pocket is attached to the exterior surface for receiving a gift card, and the pocket has one of a color, texture or material which is different from the respective color, texture or material of the exterior surface. The main body is formed by a first sheet of flexible material forming the exterior surface and a second sheet of flexible material forming the interior surface, and the first and second sheets of flexible materials are respectively different in at least one of color, texture or a material characteristic. The pocket is formed of essentially the same material as the second sheet. The first and second sheets of material are durable fabric which permits multiple continued reuses of the gift wrapping enclosure.

Another aspect of the invention involves a method of delivering a gift using a gift wrapping enclosure. The method involves inserting the gift within an interior of a main body formed of flexible material and having at least one open end providing access into the interior and also including an interior surface adjacent to the interior and an exterior surface opposite from the interior. An end portion of the main body is folded back over the exterior surface to form a cuff. A portion of the interior surface is exposed at the location where the end portion of the main body segment is folded back over the exterior surface to form the cuff. The main body is constricted at the cuff to close the open end and confine the gift within the interior, and the main body is expanded at the cuff to provide access to the interior for removing the gift.

Other and additional subsidiary aspects of the method of enclosing the gift may include the following. The opposite free ends of a drawstring located within a channel adjacent to the end portion of the main body are pulled to constrict the main body at the cuff. The amount of the end portion of the main body selected to fold back over the exterior surface form a cuff which is selectable in length. The length of the cuff is adjusted to constrict the main body adjacent to gifts of different lengths and to reduce space within the interior not consumed by the gift.

Another aspect of the invention involves a method of changing the appearance of a gift wrapping enclosure. The method involves inserting the gift within an interior of a main body formed of flexible material and having at least one open end providing access into the interior and also including an interior surface adjacent to the interior and an exterior surface opposite from the interior. One of a color, texture or material characteristic of the inside surface is different from the respective color, texture or material characteristic of the exterior surface of the main body. An end portion of the main body is unfolded which has previously been folded back over the exterior surface to form a first cuff. The exterior surface is placed adjacent to the interior of the main body while the interior surface is simultaneously placed at the outside of the gift wrapping enclosure. Thereafter, an end portion of the main body is folded back over the interior surface which is at the outside of the gift wrapping enclosure to form a second cuff of the exterior surface adjacent to the interior surface at the outside of the gift wrapping enclosure. A portion of the exterior surface at the location where the end portion of the main body segment is folded back over the interior surface at the outside of the gift wrapping enclosure forms the second cuff. The main body is constricted at the second cuff to close the open end and confine the gift within the interior. The main body is expanded at the second cuff to provide access to the interior to remove the gift.

Other aspects of the invention, and a more complete appreciation of the present invention, as well as the manner in which the present invention achieves the above and other improvements, can be obtained by reference to the following detailed description of presently preferred embodiments taken in connection with the accompanying drawings, which are briefly summarized below, and by reference to the appended claims.

DETAILED DESCRIPTION

Figure 1:
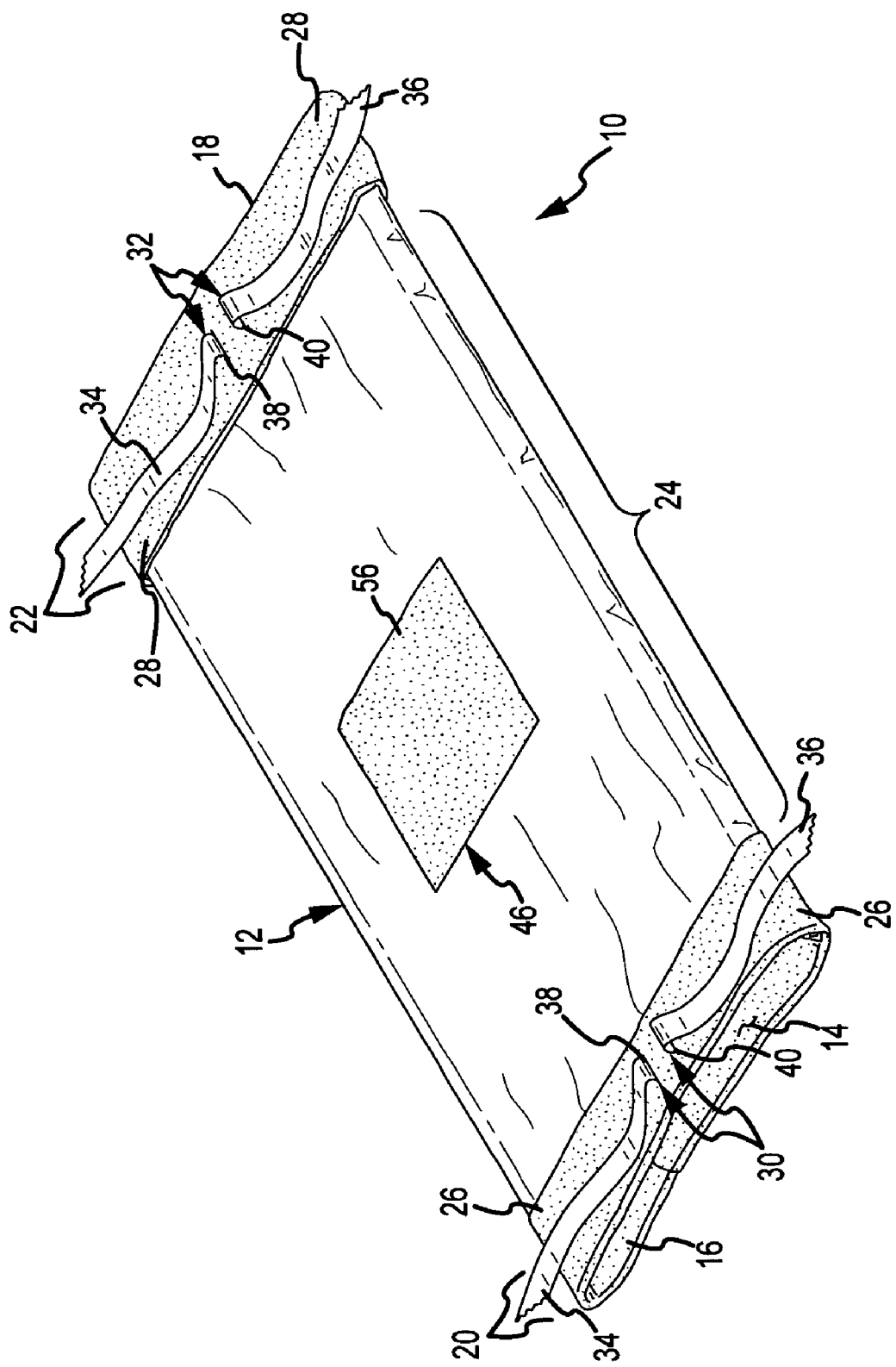
FIG. 1 is a perspective or isometric view of a gift wrapping enclosure which incorporates the present invention.

A gift wrapping enclosure 10 which embodies the present invention is shown in FIG. 1. The gift wrapping enclosure 10 is formed from a flexible main body 12 which has a tubular configuration formed by a closed side wall of the main body 12. The main body thereby defines an open interior 14 which extends between and terminates at open ends 16 and 18. End portions 20 and 22 of the tubular main body 12 are folded outward over the top of a central portion 24 of the main body 12, and thereby respectively form cuffs 26 and 28 at opposite ends of the main body 12. Each cuff 26 and 28 incorporates a drawstring 30 and 32, respectively. The drawstrings 30 and 32 are located within the interiors of the cuffs 26 and 28, and the drawstrings 30 and 32 encircle the open ends 16 and 18 surrounded by the cuffs 26 and 28, respectively. Free ends 34 and 36 of each drawstring 30 and 32 exit from the cuffs 26 and 28 at openings 38 and 40 formed in each cuff 26 and 28. In the configuration shown in FIG. 1, the openings 38 and 40 and the free ends 34 and 36 of each drawstring 30 and 32 are located at an outer exterior surface of the gift wrapping enclosure 10.

Figure 2:
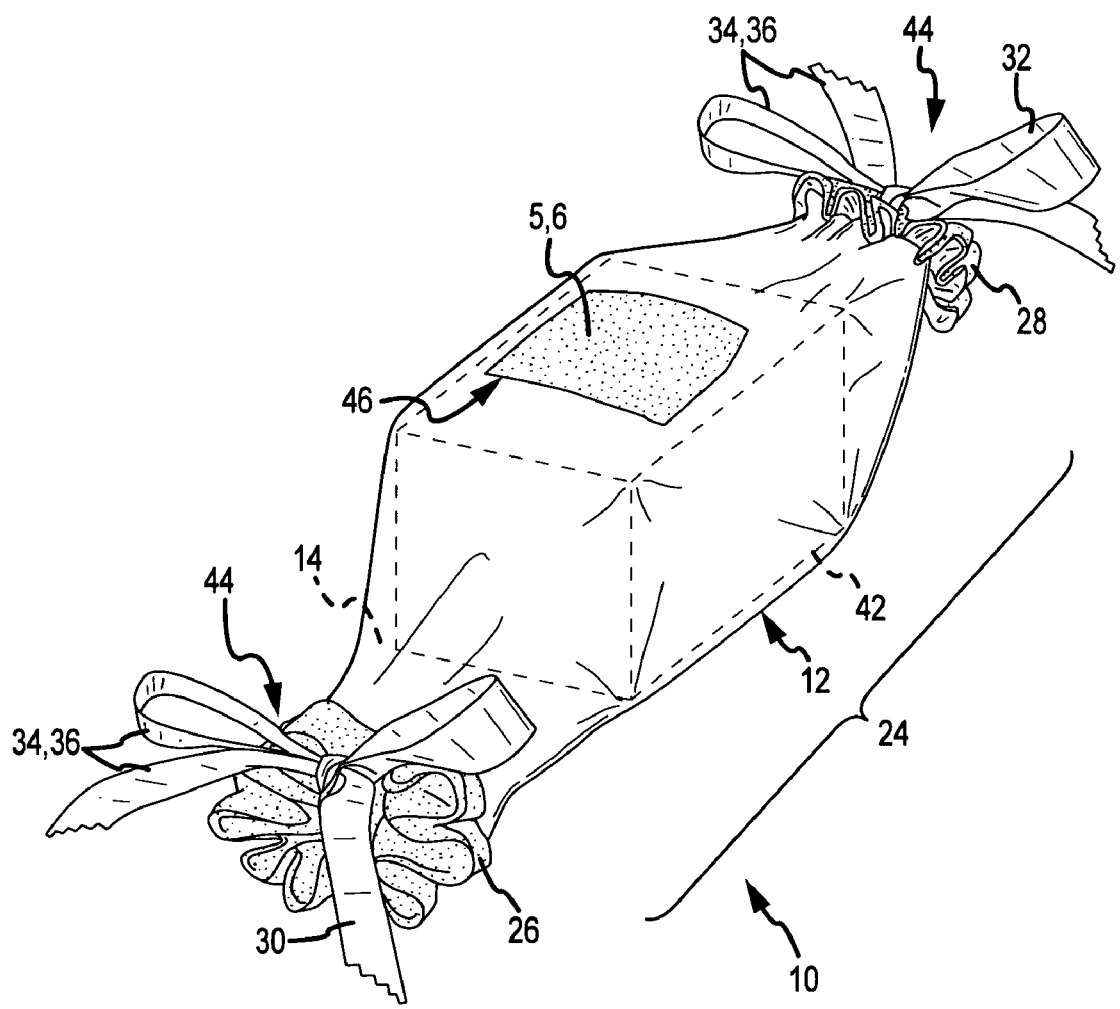
FIG. 2 is a perspective view of the gift wrapping enclosure shown in FIG. 1, in a configuration enclosing a gift item which is shown in phantom.
Figure 3:
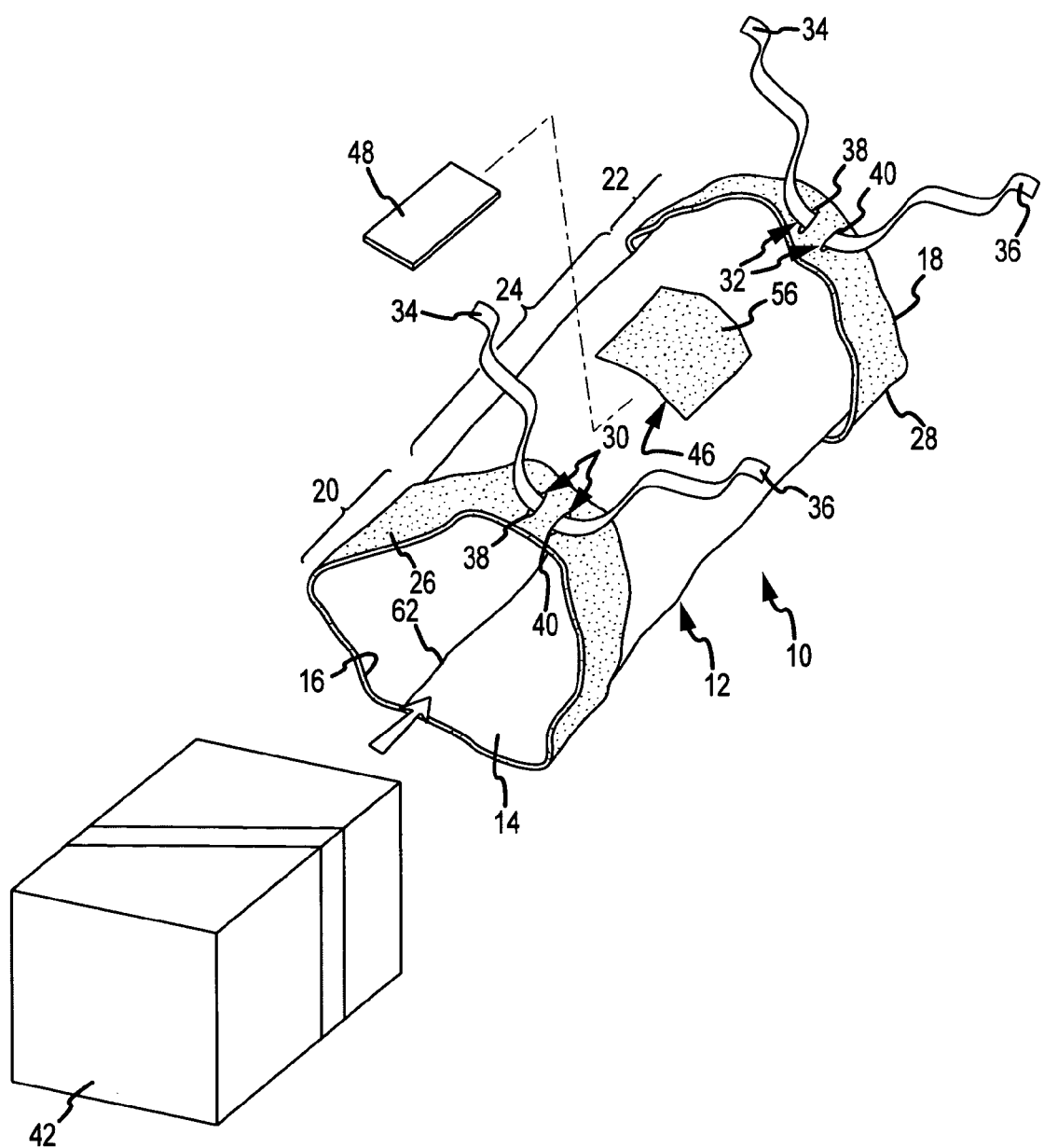
FIG. 3 is an exploded perspective view of the gift wrapping enclosure shown in FIGS. 1 and 2 and a gift item to be enclosed within the gift wrapping enclosure.

Drawing more of the free ends 34 and 36 of each drawstring 30 and 32 from the openings 38 and 40 causes each cuff 26 and 28 to constrict in a ruffle-like configuration and thereby close off the open ends 16 and 18, as shown in FIG. 2. In this regard, the drawstrings constitute one functional example of constriction elements. Before one or both of the open ends 16 and 18 is closed by constriction of the cuffs 26 and 28 resulting from pulling more of the free ends 34 and 36 of the drawstrings 30 and 32 from the cuffs 26 and 28 as shown in FIG. 2, a gift item 42 is placed into an interior 14 of the main body 12 through one of the open ends 16 and 18 as shown in FIG. 3. The gift item 42 is confined within the interior 14 by pulling the drawstrings 30 and 32, and preferably tying the free ends 34 and 36 in a bow 44 or other decorative configuration as shown in FIG. 2. The gift item 42 is securely retained within the gift wrapping enclosure 10 by the constricted ends 14 and 16 of the main body 12. The constricted ends of the main body 12 also prevent any gaps or openings through which the gift item 42 could be observed or through which the gift item 42 could be removed from the interior 14 without loosening the drawstrings 30 and 32.

A pocket 46 is one important feature of the gift wrapping enclosure 10 and is attached to the exterior surface of the central portion 24 of the main body 12. The pocket 46 allows a gift card 48 to be inserted into the pocket 46, as shown in FIG. 3. The gift card 48 will typically include the name of the gift-giver and the name of the gift-recipient, but could also include any other information that the gift-giver may desire to include. The pocket 46 allows the gift card 48 to be easily attached to the gift wrapping enclosure 10 and maintained in a secure associated relationship with the gift item 42 confined within the gift wrapping enclosure 10.

Figure 4:
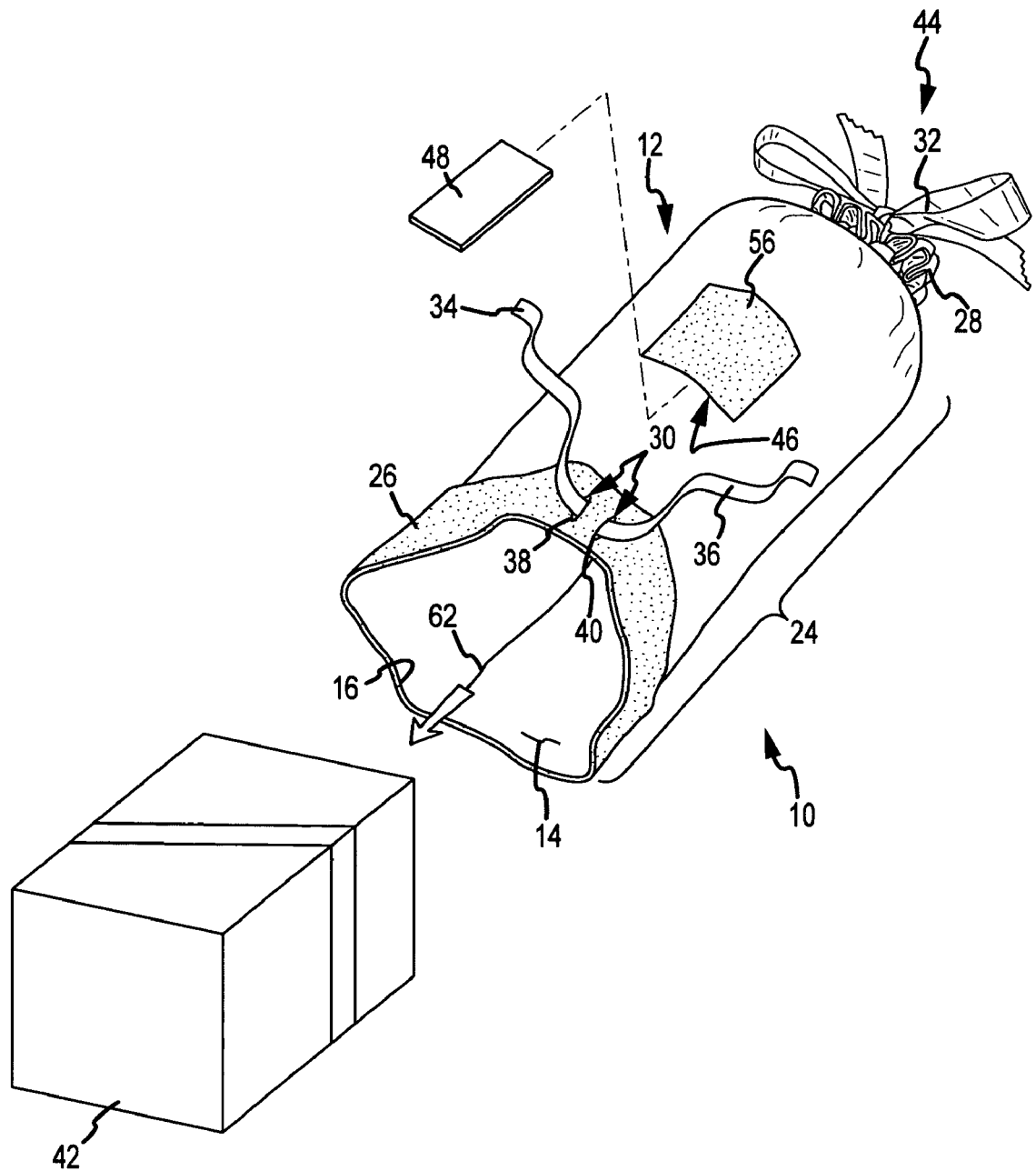
FIG. 4 is an exploded perspective view similar to FIG. 3, but illustrating a closed configuration of one end of the gift wrapping enclosure and a gift card to be inserted in a pocket of the gift wrapping enclosure.

To retrieve the gift item 42 from the interior 14 of the gift wrapping enclosure 10, the gift-recipient unties at least one bow 44, as shown in FIG. 4, reaches into the constricted end 16 of the main body 12 and expands the constricted end 16 to open it up to provide access into the interior 14 of the main body, as shown in FIG. 4. The constricted end is expanded by drawing some of the free ends 34 and 36 of the drawstring 30 into the openings 38 and 40. Thereafter, the gift-recipient reaches into the interior 14 to remove the gift item 42. The gift card 48 is retrieved by grasping it and withdrawing it from the pocket 46.

Figure 5:
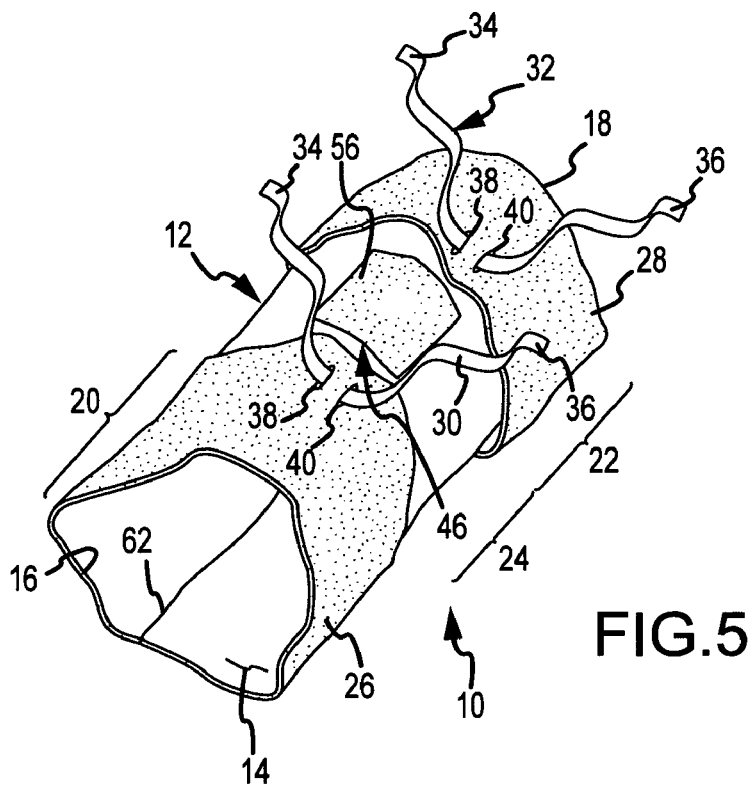
FIG. 5 is a perspective view of the gift wrapping enclosure shown in FIG. 1, with larger cuffs used for enclosing a relatively smaller gift item.
Figure 6:
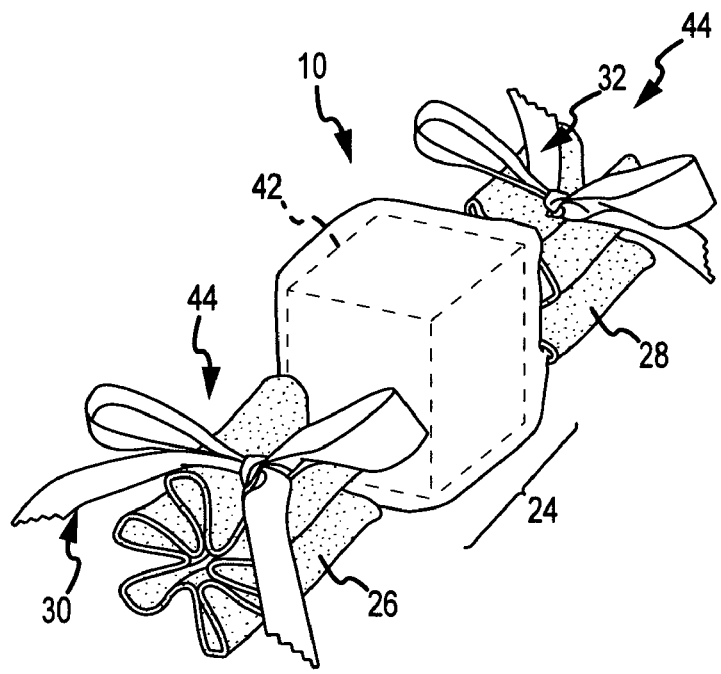
FIG. 6 is a perspective view of the gift wrapping enclosures shown in FIG. 6, enclosing a relatively smaller gift item which is shown in phantom.

One important feature of the gift wrapping enclosure 10 is that the amount of the end portions 20 and 22 of the main body 12 which form the cuffs 26 and 28, respectively, can be adjusted in accordance with the size of the gift item 42, thereby creating a neat and aesthetic appearance of the gift wrapping enclosure 10 with the gift item 42 confined within it. For example, as shown in FIG. 5, a larger amount of the end portions 20 and 22 have been folded over the main body 12 to form cuffs 26 and 28 of greater widths than the cuffs 26 and 28 shown in FIG. 1. When the smaller gift item 42 is inserted, as shown in FIG. 6, the greater-width cuffs 26 and 28 position the drawstrings 30 and 32 closer to the gift item 42 and cause the main body 12 to constrict more closely around the gift item 42. The greater-width cuffs 26 and 28 constrict in a larger ruffle-like configuration which does not detract from the aesthetic appearance of the gift wrapping enclosure 10. However, if the narrower-width cuffs 26 and 28 were used when confining the smaller gift item 42 shown in FIG. 6, there would be an excessive amount of material of the main body 12 between the constricted drawstrings which could create a bag-like or bloated appearance of the gift wrapping enclosure 10. In addition to being somewhat unaesthetic, such a bloated appearance could convey the impression that no gift was contained within the gift wrapping enclosure 10.

Figure 7:
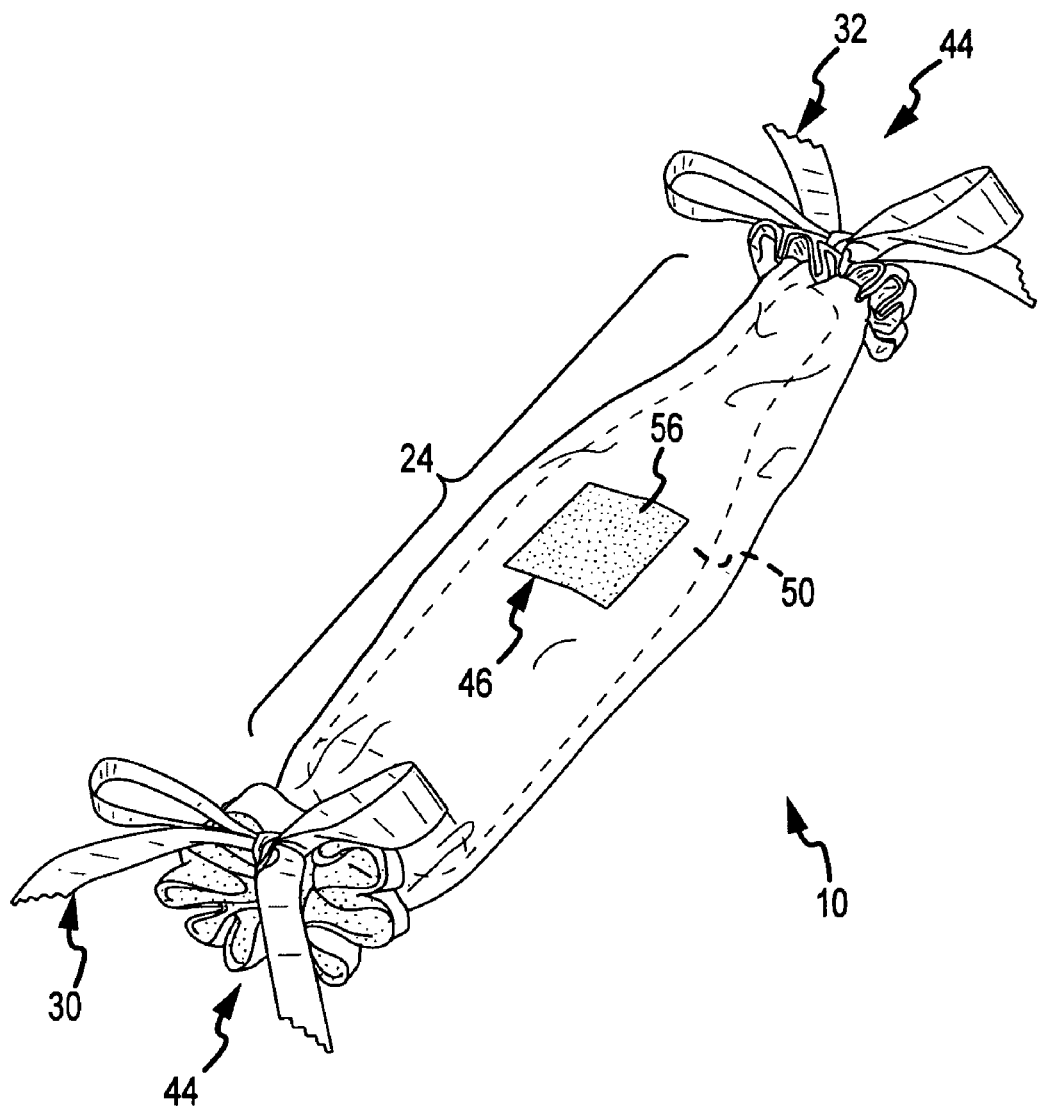
FIG. 7 is a perspective view of the gift wrapping enclosures shown in FIG. 1, in a configuration for enclosing a relatively long gift item which is shown in phantom.

In a related manner, the cuffs 26 and 28 can be unfolded to cause the end portions 20 and 22 to become part of the central portion 24, as shown in FIG. 7, thereby lengthening the interior 14 to enable it to confine a relatively long gift item 42, such as a beverage bottle 50. Under this circumstance, the drawstrings 30 and 32 extend from the openings 38 and 40 into the interior 14 of the elongated main body 12 at the open ends, but because the openings 38 and 40 are adjacent to the terminal ends of the main body 12, the free ends 34 and 36 of the drawstrings 30 and 32 may still be pulled to constrict the open ends of the main body 12 into a ruffle-like configuration, and bows 44 may still be tied in the free ends 34 and 36 in the manner shown in FIG. 7, to create an aesthetically appealing appearance. The bows 44, or other retaining features, extend from the center of the ruffle-like configuration formed by constricting the open ends of the main body 12, as shown in FIG. 7, rather than from the exterior as shown in FIG. 2.

Although not shown, one of the cuffs could be unfolded into the configuration shown in FIG. 7, and the other one of the cuffs could remain folded into one of the configurations shown in FIG. 1 or 5.

Thus, the cuffs 26 and 28 with the drawstrings 30 and 32 which extend from the cuffs 26 and 28 can be advantageously used to shorten the overall length of the gift wrapping enclosure 10 to accommodate a relatively short gift item, and to lengthen the overall length of the gift wrapping enclosure 10 to accommodate a relatively long gift item. Such adjustability in size of the gift wrapping enclosure 10 assures a desirable aesthetic appearance.

Another important feature of the gift wrapping enclosure 10 which creates a desirable aesthetic appearance is that the cuffs 26 and 28 are made of a contrasting color, material characteristic or texture compared to the exterior surface of the main body 12. The contrasting color, material characteristic or texture is represented in FIGS. 1-7 by stippling. Even when the cuffs 26 and 28 are unfolded into the configuration shown in FIG. 7, the contrasting color, material characteristic or texture of the cuffs 26 and 28 is still visible at the interior ruffle-like configuration of the constricted ends. A pleasantly contrasting appearance is therefore always available, regardless of the configuration of the gift wrapping enclosure 10.

The pocket 46 is also preferably made of a contrasting color, material characteristic or texture compared to the exterior surface of the main body 12. The contrasting color, material characteristic or texture of the pocket 46 also contributes to the aesthetic appearance of the gift wrapping enclosure 10.

The gift wrapping enclosure 10 is preferably made of flexible material which can be connected, such as fabric material which can be sewn or stitched, by following the sequence of manufacturing shown in FIGS. 8-15.

Figure 8:
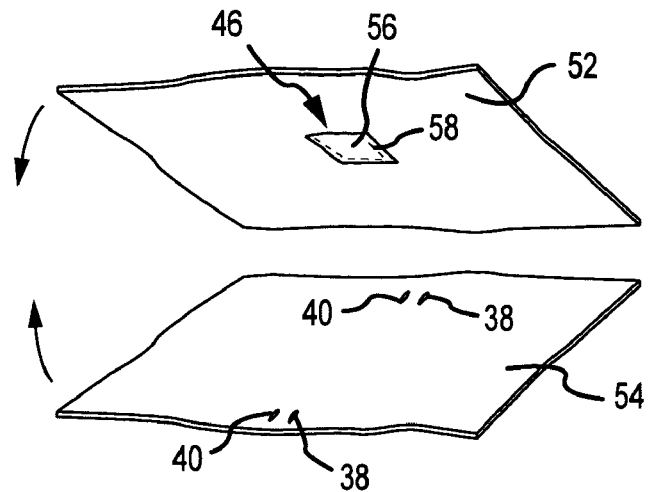
FIG. 8 is a perspective view of two fabric sheets used in making the gift wrapping enclosure shown in FIG. 1.

Preferably, the main body 12 is made up from two generally rectangularly-shaped sheets 52 and 54 of fabric material, as shown in FIG. 8. The first fabric sheet 52 forms the exterior surface of the main body 12 and second fabric sheet 54 forms the interior surface of the main body 12 which faces the interior 14 (FIGS. 1 and 3-5). The first fabric sheet 52 is preferably of a different color, texture or material characteristic than the second fabric sheet 54, thereby creating a pleasing and attractive visual contrast at the cuffs 26 and 28 and within the interior 14 of the main body 12 (FIGS. 1-7). A patch 56 or small segment of fabric, preferably the same type of fabric as the second fabric sheet 54, is used to form the pocket 46, thereby further contributing to the aesthetically pleasing contrasting appearance. The patch 56 could also be formed from material which is different in color, texture or material characteristics from either of the first or second sheets 52 or 54.

The patch 56 is attached to the first fabric sheet by sewing at a seam 58 (FIG. 8). The seam 58 extends along three sides of the patch 56 to create an open end between the patch 56 and the first fabric sheet 52 to form the pocket 46. It is through this opening that the gift card 48 (FIG. 3) is inserted.

The openings 38 and 40 are thereafter formed through the second fabric sheet 54, as shown in FIG. 8. The openings 38 and 40 are formed through the second fabric sheet 54, because portions of the second fabric sheet 54 form the exterior surface of the cuffs 26 and 28, when the end portions 20 and 22 are folded over the top of the central portion 24, as shown in FIG. 1. The openings 38 and 40 can be formed by buttonhole sewing. The openings 38 and 40 can also be created by grommets or other types of conventional opening-creating devices.

Figure 9:
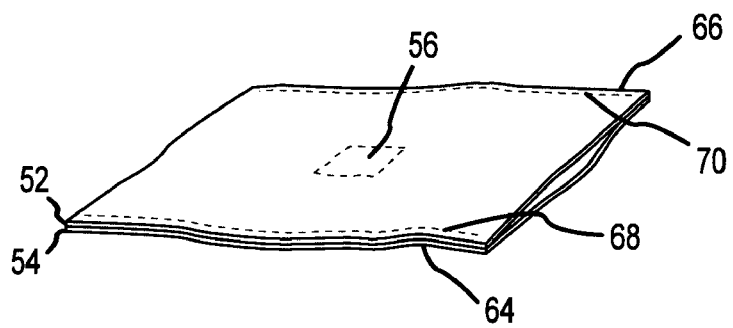
FIG. 9 is a perspective view of the two fabric sheets shown in FIG. 8, in contact with one another and seamed at the edges.
Figure 10:
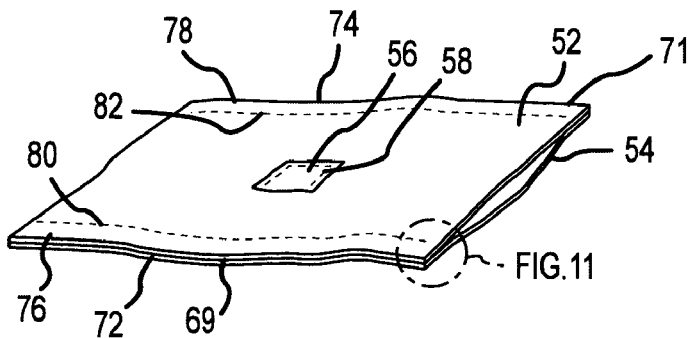
FIG. 10 is a perspective view of the two fabric sheets shown in FIG. 9, showing the creation of channels for drawstrings.
Figure 11:
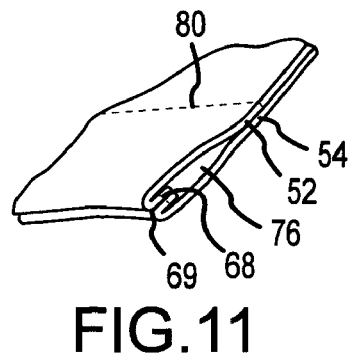
FIG. 11 is an enlarged view a portion of the two fabric sheets shown in FIG. 10 bounded by the line 11-11.

The fabric sheets 52 and 54 are brought together in overlaying contact with one another, with the eventual desired exterior surface of both fabric sheets including the patch 56 to the inside, as shown in FIG. 9. The fabric sheets 52 and 54 are then sewn together near end edges 64 and 66 creating end seams 68 and 70. The now combined fabric sheets 52 and 54 are then turned inside-out so that hems 69 and 71, created by the end seams 68 and 70, become the finished ends 72 and 74, respectively, as shown in FIGS. 10 and 11.

Channels 76 and 78 for containing the drawstrings 30 and 32, respectively, are formed between the fabric sheets 52 and 54 adjacent to the finished ends 72 and 74, respectively. The channels 76 and 78 are completed by sewing the fabric sheets 52 and 54 together at channel seams 80 and 82, as shown in FIG. 10. The channel 76 extends between the hem 69 at the finished end 72 and the seam 80 and the fabric sheets 52 and 54, and the channel 78 extends between the hem 71 and the seam 82 and the fabric sheets 52 and 54.

Figure 12:
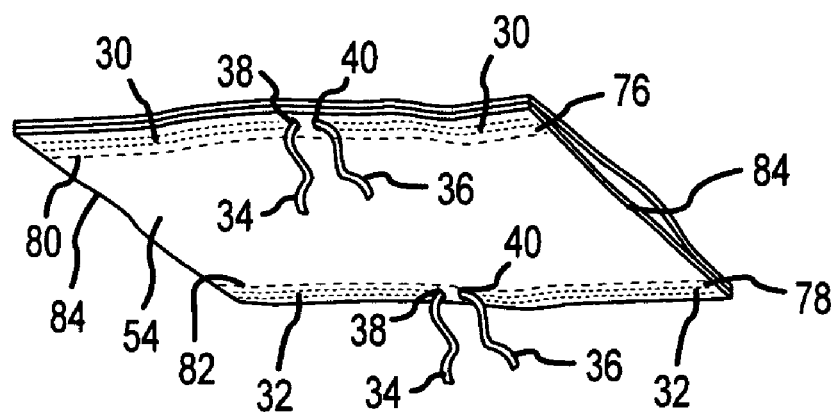
FIG. 12 is a perspective view of the two fabric sheets shown in FIG. 10 with drawstrings added.

Drawstrings 30 and 32 (FIG. 1) are each formed from two separate pieces, preferably of ribbon-like material, which are inserted into the channels 76 and 78, as shown in FIG. 12. Interior ends of the drawstrings 30 and 32 within the channels 76 and 78 are aligned with longitudinal edges 84, and may be temporarily secured in position. The free ends 34 and 36 of the drawstrings 30 and 32 emerge from the channel openings 38 and 40.

Figure 13:
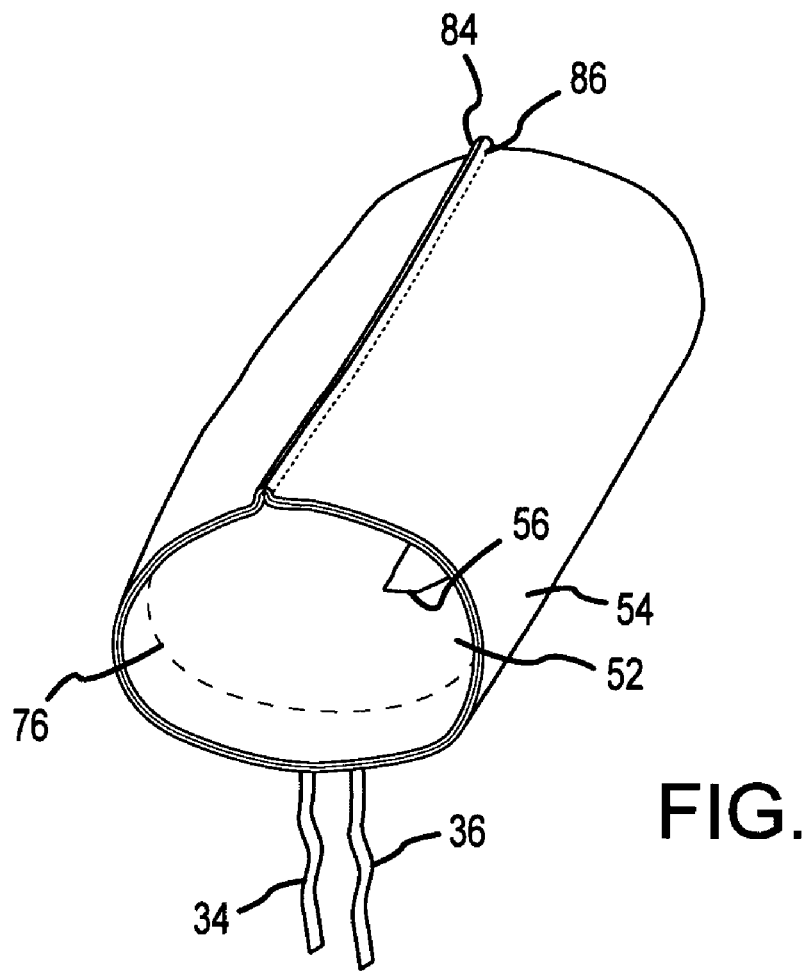
FIG. 13 is a perspective view of the two fabric sheets shown in FIG. 12 formed into a tubular configuration and stitched together at a longitudinal seam.
Figure 14:
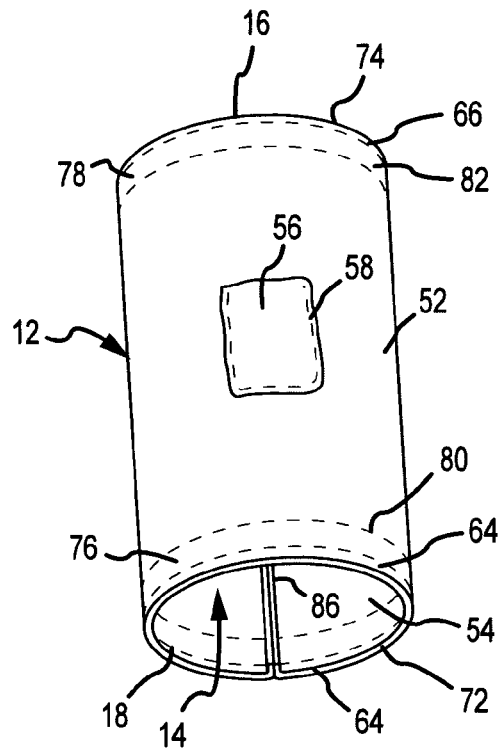
FIG. 14 is a perspective view of the tubular configuration shown in FIG. 12 turned inside-out.

The longitudinal edges 84 of the fabric sheets 52 and 54 are brought together with fabric sheet 52 again facing the interior. The longitudinal edges 84 are sewn together at longitudinal seam 86 to create the general tubular shape of the main body as shown in FIG. 13. When the longitudinal edges 84 of the fabric sheets 52 and 54 are sewn at the longitudinal seam 86, the drawstrings 30 and 32 are also sewn into and become a part of the longitudinal seam 86. The tubular shape is then turned inside out so that the longitudinal edges 84 face inward and the patch 56 is on the outside, as shown in FIG. 14.

Figure 15:
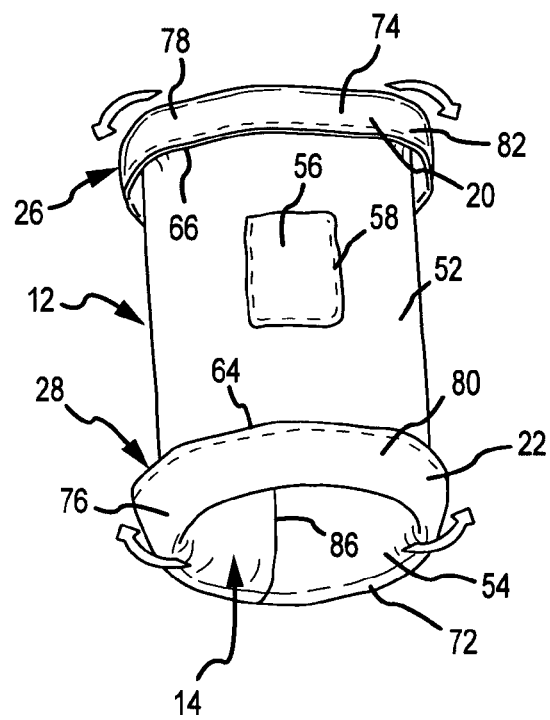
FIG. 15 is a perspective view similar to FIG. 14, showing folding back portions of the tubular configuration to form cuffs.

The cuffs 26 and 28 are formed by folding the end portions 20 and 22 over the exterior of the main body 12, as shown in FIG. 15. In doing so, the second fabric sheet 54 becomes exposed at the cuffs 26 and 28 on the exterior surface of the main body 12, as shown in FIG. 1. Thus, the contrasting second fabric sheet 54 becomes exposed at the cuffs 26 and 28.

The main body 12 can also be turned completely insideout. In this circumstance, the color, texture or material characteristic of the second fabric sheet 54 constitutes the main external appearance of the gift wrapping enclosure 10, while the color, texture or material characteristic of the first fabric sheet 52 is exposed at the cuffs 26 and 28. When the main body 12 is turned inside-out in this manner, the openings 38 and 40 in the cuffs 26 and 28 are not exposed, but face inward toward the central portion 24 of the main body 12 beneath each of the cuffs 26 and 28. Nevertheless, the cuffs 26 and 28 can still be constricted by pulling the free ends 34 and 36 of the drawstrings 30 and 32 to create the ruffle-like appearance. This circumstance is similar to that previously described in conjunction with FIG. 7, where the drawstrings 30 and 32 exit from the interior of the unfolded main body 12. The inside-out configuration may be preferable when wrapping a long gift item such as the beverage bottle 50 shown in FIG. 7 so that the drawstrings 30 and 32 are positioned on the exterior surface of the unfolded main body 12 where they are more easily accessed. Of course, when the main body is turned inside-out, the pocket 46 is not available for use because it is located within the interior 14 of the gift wrapping enclosure 10.

Figure 16:
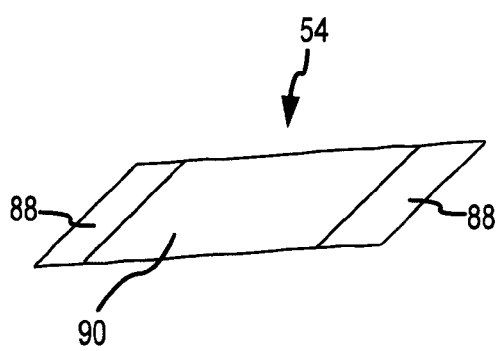
FIG. 16 is a perspective view similar to FIG. 8, showing an alternative form of one of the two fabric sheets.

As an alternative to making the entire second fabric sheet 54 of the same type of material, a strip of contrasting fabric 88 is attached at the end portions 20 and 22 of the second fabric sheet 54, as shown in FIG. 16. Under this circumstance, each fabric strip 88 encircles the open ends 16 and 18 of the main body 12 (FIG. 1), at a position where each fabric strip 88 is folded outward on top of the central portion 24 of the main body, thereby creating an aesthetic appearance which is different from both the first fabric sheet 52 and the central portion 24 of the second fabric sheet 54 between the fabric strips 84. In this manner, three different contrasting portions of the gift wrapping enclosure 10 may be created: the exterior of the main body, the interior of the main body and the exterior of the cuff formed by the fabric strips 88. A fourth contrast could also be created by making the pocket 46 of a fourth different color, texture or material characteristic.

Attaching the strips 88 of contrasting fabric at the end portions 20 and 22 of the second sheet 54, as shown in FIG. 16, is particularly useful for relatively long gift wrapping enclosures 10 (FIG. 1) which are not intended to be reversed or turned inside out. A center portion 90 of the sheet 54 between the strips 88 may be made of less attractive and less expensive material, because the center portion 90 will not be observed due to the fact that the gift wrapping enclosure will not be reversed. The center portion 90 will always remain hidden from sight within the interior 14 of the gift wrapping enclosure 10 (FIG. 1). Only all or a portion of the fabric strips 88 fold over to form the cuffs 26 and 28, and it is only the folded-over portions of the fabric strips 88 which form cuffs of the contrasting color, texture and/or material characteristic compared to the central portion 24 (FIG. 1).

As an alternative to attaching the fabric strips 88 to the center portion 90 of the second sheet 54, the fabric strips 88 could be attached to the first sheet 52 on the inside side of the first sheet 52 that would normally be adjacent to the second sheet 54 (as understood from FIG. 10, for example). The fabric strips 88 would therefore be located on the inside surface of the first sheet 52 at the end portions 20 and 22 before the cuffs 26 and 28 are formed. No second sheet 54 is used on the inside surface of the interior 14 extending between the fabric strips 88. Instead, the inside surface of the exterior sheet 52 becomes the inside surface of the gift wrapping enclosure 10, except where the strips 88 are attached at each open end 16 and 18. With the fabric strips 88 positioned in this manner, folding the end portions 20 and 22 over to form the cuffs 26 and 28 exposes the material of the strips 88, and the interior 14 of the gift wrapping enclosure 10 (FIG. 1) is adjoined principally by the inside surface of the exterior sheet 52.

The appearance of the gift wrapping enclosure can also be changed by turning the gift wrapping enclosure 10 inside out. Doing so reverses the contrasting color, texture and/or material characteristics of the cuffs 26 and 28 and the pocket 46 relative to the central portion 24 (FIG. 1). To reverse the gift wrapping enclosure 10, the cuffs are unfolded to create the configuration similar to that shown in FIG. 14. Thereafter, one open end 16 or 18 is pulled through the interior 14 until it emerges from the other open end 18 or 16. At this point, the configuration has the previously-inside sheet 52 or 54 oriented to face the exterior and the previously-exterior sheet 54 or 52 oriented to face the interior 14. Thereafter, the end portions 20 and 22 are folded back on the exterior to form the cuffs 26 and 28, respectively, as shown in FIG. 15. Reversing the gift wrapping enclosure 10 in this manner allows two differently-appearing gift wrapping enclosures 10 to be available for use, due to the contrasting colors, textures and material characteristics.

In addition to its utility for wrapping gifts, the gift wrapping enclosure 10 addresses environmental concerns by reducing natural resource consumption. Because the gift wrapping enclosure 10 is reusable and formed of sturdy durable fabrics, the need for decorative wrapping paper and boxes within which to contain gifts is diminished. Furthermore, by reducing the amount of disposable trash created by using decorative wrapping paper and boxes, the amount of landfill space that would otherwise be taken up is diminished.

The gift wrapping enclosure 10 is adjustable in length to accommodate a variety of differently sized gifts. The gift wrapping enclosure 10 has aesthetically pleasing contrasting colors, textures and material characteristics which enhance its desirability for use, and its colors, textures and material characteristics can be changed by reversing or turning it inside out. The pocket 46 forms an advantageous vehicle to attach and enclose a gift card for the recipient.

The significance of these and other improvements and advantages will become apparent upon gaining a full appreciation of the ramifications and improvements of the present invention. Preferred embodiments of the invention and many of its improvements have been described with a degree of particularity. The detail of the description is of preferred examples of implementing the invention. The detail of the description is not necessarily intended to limit the scope of the invention. The scope of the invention is defined by the following claims.

What is claimed:

1. A gift wrapping enclosure in which to give a gift, comprising:
   a main body formed of flexible material and having a generally tubular configuration with two opposite open ends providing access into an interior of the main body, the interior receiving the gift, the main body also including an interior surface adjacent to the interior and an exterior surface opposite from the interior;
   a channel formed in the main body adjacent to and circumscribing each open end;
   a constriction element located within each channel for constricting the main body at each channel to close the open end and to allow for expanding the main body to open each open end to provide access to the interior and the gift within the interior; and
   cuffs surrounding each open end formed by end portions of the main body adjacent to the two opposite open ends which are each folded back to create the cuffs from the interior surface at opposite ends of the main body, each cuff exposing a portion of the interior surface at the location where the end portion of the main body is folded back over the exterior surface, the folded back end portion of the main body which forms each cuff including the channel and the constriction element, and wherein:
   the interior surface has one of a color, texture or material characteristic which is different from the respective color, texture or material characteristic of the exterior surface adjacent to each cuff.

2. A gift wrapping enclosure as defined in claim 1, wherein:
   at least one of the end portions of the main body which is folded back over the exterior surface to form the cuff is selectable in length to constrict the main body adjacent to each of a plurality of gifts having different lengths received within the interior of the main body.

3. A gift wrapping enclosure as defined in claim 1, wherein:
   each constriction element comprises a drawstring having free ends which extend from opposite ends of each channel and which can be connected together to maintain the constriction of the main body to close the open end.

4. A gift wrapping enclosure as defined in claim 1, further comprising:
   a pocket attached to the exterior surface for receiving a gift card; and
   the pocket has one of a color, texture or material characteristic which is different from the respective color, texture or material characteristic of the exterior surface.

5. A gift wrapping enclosure as defined in claim 4, wherein:
   the pocket has one of a color, texture or material characteristic which is substantially similar to at least one of the color, texture or material characteristic of the interior surface.

6. A gift wrapping enclosure as defined in claim 4, wherein:
the pocket has one of a color, texture or material characteristic which is substantially similar to the color, texture or material characteristic of each cuff.

7. A gift wrapping enclosure as defined in claim 1, wherein:
the main body comprises a first sheet of flexible material forming the exterior surface and a second sheet of flexible material forming the interior surface; and
the first and second sheets of flexible materials are respectively different in at least one of color, texture or material characteristic.

8. A gift wrapping enclosure as defined in claim 7, further comprising:
a pocket attached to the exterior surface for receiving a gift card; and
the pocket is formed of essentially the same material as the second sheet.

9. A gift wrapping enclosure as defined in claim 7, wherein:
the first and second sheets of material are durable fabric which permits multiple continued reuses of the gift wrapping enclosure.

10. A gift wrapping enclosure as defined in claim 7, wherein:
at least one of the first or second sheets of flexible material comprises fabric.

11. A gift wrapping enclosure as defined in claim 1, wherein:
the two cuffs are substantially similar to one another in at least one of color, texture and material characteristic.

12. A gift wrapping enclosure as defined in claim 1, wherein:
the flexible material forming the main body comprises durable fabric material which permits multiple continued reuses of the gift wrapping enclosure; and
the exterior surface and the interior surface are both fabric material surfaces.

13. A gift wrapping enclosure as defined in claim 1, further comprising:
a pocket attached to the exterior surface for receiving a gift card.

14. A gift wrapping enclosure as defined in claim 1, wherein:
the interior surface includes a strip of material circumscribing at least one open end;
each strip of material has one of a color, texture or material characteristic which is different from the respective color, texture or material characteristic of the exterior surface adjacent to each cuff; and
the end portion of the main body which is folded back creates the cuff from the strip of material at the at least one open end.

15. A gift wrapping enclosure as defined in claim 14, wherein:
the main body comprises a first sheet of flexible material forming the exterior surface and a second sheet of flexible material forming the interior surface;
the second sheet of flexible material comprises a center portion and strips of material attached on opposite sides of the center portion, the center portion located adjacent to the interior; and
the end portions of the main body which are folded back create the cuffs from the strips of material at the opposite open ends.

16. A gift wrapping enclosure as defined in claim 14, wherein:
the main body comprises a sheet of flexible material forming the exterior surface;
the strip of material is attached to the sheet of material forming the exterior surface; and
an interior surface of the sheet of flexible material is located adjacent to the interior.

17. A method of delivering a gift using the gift wrapping enclosure defined in claim 1, comprising:
inserting the gift within the interior of the main body through one open end;
constricting the main body at the cuff to close the open end and confine the gift within the interior; and
expanding the main body at the cuff to open the closed end and provide access to the interior to remove the gift.

18. A method as defined in claim 17, wherein each constriction element comprises a drawstring, and the method further comprises:
pulling at least one opposite free end of a drawstring located within a channel adjacent to the end portion of the main body to constrict the main body at one of the cuffs.

19. A method as defined in claim 17, further comprising:
selecting an amount of at least one end portion of the main body to fold back over the exterior surface to form the cuff to a selected length.

20. A method as defined in claim 19, further comprising:
adjusting the length of the at least one cuff to constrict the main body adjacent to each of a plurality of gifts having different lengths received within the interior.

21. A method as defined in claim 19, further comprising:
adjusting the length of the at least one cuff to constrict the main body and reduce space within the interior between the gift and the constriction.

22. A method of changing the appearance of the gift wrapping, enclosure defined in claim 1, comprising:
inserting the gift within the interior of the main body through one open end;
showing one of the color, texture or material characteristic of the inside surface at a first one of the cuffs;
unfolding the end portion of the main body which has previously been folded back over the exterior surface to form the other second one of the cuffs; and thereafter;
exposing a portion of the exterior surface at the location where the second one of the cuffs is unfolded;
constricting the main body to close the open ends and confine the gift within the interior; and
expanding the main body at one of the closed ends to to open the closed end and provide access to the interior to remove the gift.

* * * * *